US011539413B1

(12) United States Patent
Larionov et al.

(10) Patent No.: US 11,539,413 B1
(45) Date of Patent: Dec. 27, 2022

(54) METHOD FOR EFFICIENT BEAMFORMEE IMPLEMENTATION FOR WI-FI

(71) Applicant: NXP USA, Inc., Austin, TX (US)

(72) Inventors: Nikolaj Larionov, Santa Clara, CA (US); Sridhar R. Narravula, Cupertino, CA (US); Mao Yu, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 485 days.

(21) Appl. No.: 16/689,894

(22) Filed: Nov. 20, 2019

Related U.S. Application Data

(60) Provisional application No. 62/770,079, filed on Nov. 20, 2018.

(51) Int. Cl.
*H04B 7/06* (2006.01)
*H04W 84/12* (2009.01)
*H04B 1/40* (2015.01)
*H04B 7/0413* (2017.01)

(52) U.S. Cl.
CPC ............ *H04B 7/0617* (2013.01); *H04B 1/40* (2013.01); *H04B 7/0626* (2013.01); *H04W 84/12* (2013.01); *H04B 7/0413* (2013.01)

(58) Field of Classification Search
CPC .. H04B 7/0617; H04B 7/0626; H04B 7/0417; H04B 7/0619; H04B 7/0413; H04B 1/40; H04W 84/12
USPC ...................................................... 370/338
See application file for complete search history.

(56) References Cited

U.S. PATENT DOCUMENTS

| 10,439,701 | B2 | 10/2019 | Roy et al. |
| 10,601,486 | B1 | 3/2020 | Roy et al. |
| 2008/0045153 | A1* | 2/2008 | Surineni ............... H04B 7/0636 455/63.1 |

* cited by examiner

*Primary Examiner* — Leila Malek

(57) ABSTRACT

Methods and systems for providing beamforming feedback in a communication channel are disclosed. A data packet is received at a beamformee circuitry of the first communication device configured to generate beam steering data for use by a transmitter of a second communication device. Each of a plurality of tones of the received data packet is processed to generate a compressed steering matrix corresponding to the communication channel. In parallel to the processing of the received plurality of tones, an immediate feedback packet comprising a plurality of data symbols is constructed, where the data symbols include the generated compressed steering matrix. At least a first data symbol of the immediate feedback packet is transmitted prior to completing the processing of all the plurality of tones of the received data packet.

20 Claims, 8 Drawing Sheets

METHOD FOR EFFICIENT BEAMFORMEE IMPLEMENTATION FOR WI-FI

CROSS REFERENCE TO RELATED APPLICATION

This disclosure claims the benefit of commonly-assigned U.S. Provisional Patent Applications No. 62/770,079, filed Nov. 20, 2018, which is hereby incorporated by reference herein in its entirety.

FIELD OF USE

This disclosure generally relates to a method for providing compressed beamforming feedback of a communication channel. More particularly, to devices and techniques for estimating and providing channel feedback based on received signals for use by a transmitting device for beam steering.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 600 Mbps, and IEEE 802.11ac Standard specifies a single-user peak throughput in the gigabits per second (Gbps) range. The IEEE 802.11ax Standard, now under development, promises to provide even great throughput, such as throughputs in the tens of Gbps range.

Increased throughput necessitates advanced transmission techniques, such as beamforming, which rely on estimating channel conditions between the transmitter and the receiver. Moreover, given that channel conditions can frequently change, it is important to calculate the beamforming matrices and send the channel information in a very short time period so that subsequent data packets can be steered to meet the high throughput requirements. However, meeting such challenging time constraints require significantly increased computational power demands.

SUMMARY

Embodiments described herein provide a method for providing beamforming feedback in a communication channel. The method includes receiving, at a first communication device, a data packet from a second communication device via the communication channel. At a beamformee circuitry of the first communication device configured to generate beam steering data for use by a transmitter of the second communication device, each of a plurality of tones of the received data packet is processed to generate a compressed steering matrix corresponding to the communication channel. In parallel to the processing of the received plurality of tones, at the beamformee circuitry of the first communication device, an immediate feedback packet comprising a plurality of data symbols is constructed, where the data symbols include the generated compressed steering matrix. The method further includes transmitting at least a first data symbol of the immediate feedback packet, prior to completing the processing of all the plurality of tones of the received data packet, from the first communication device to the second communication device, the constructed data symbols being for use by the second communication device to steer at least one subsequent transmission to the first communication device.

In some embodiments, the size of each of the data symbols of the immediate feedback packet depends on a number of data bits per symbol specified in a modulation and coding scheme (MCS) defined for the immediate feedback packet, a number of available streams, and available bandwidth.

In some embodiments, each data symbol of the immediate feedback packet is constructed at a rate specified by the number of data bits per symbol specified in the MCS.

In some embodiments, each data symbol of the immediate feedback packet is constructed by processing the plurality of tones of the received data packet to generate the compressed steering matrix at a rate specified by the number of data bits per symbol specified in the MCS.

In some embodiments, a transmitter of the first communication device provides a request to the beamformee circuitry of the first communication device for a first data symbol of the immediate feedback packet to be transmitted to the second communication device, and the beamformee circuitry of the first communication device, prior to receiving the request, is configured to process a sufficient number of tones of the received data packet to construct at least a number of bits sufficient to enable the transmitter of the first communication circuitry to transmit the first data symbol at the rate specified by the number of data bits per symbol specified in the MCS.

In some embodiments, constructing the data symbols of the immediate feedback packet comprises estimating a steering matrix based on a Long-Training Field (LTF) training sequence of a preamble of the received data packet, and performing a compression operation on each tone of the received data packet.

In some embodiments, a processing duration of each tone of the received data packet is dependent on a dimension of a channel state information (CSI) matrix defined by a number of transmitters of the second communication device and a number of receivers of the first communication device.

In some embodiments, the method further includes deriving, at the first communication device, a first intermediate matrix from the CSI matrix by determining a product of the CSI matrix and a Hermitian transpose of the CSI matrix, finding a maximum diagonal element of the first intermediate matrix based on the number of transmitters of the second communication device, estimating an upper triangle matrix of the first intermediate matrix based on a number of Long-Training Field (LTF) training symbols of a preamble of the received data packet, and scaling the estimated upper triangle matrix of the first intermediate matrix based on the maximum diagonal elements of the first intermedia matrix.

In some embodiments, the method further includes deriving, at the first communication device, a second intermediate matrix by determining a product of the first intermediate matrix and a Hermitian transpose of the first intermediate matrix, finding a maximum diagonal element of the second intermediate matrix based on the number of transmitters of the second communication device, and iteratively estimating and scaling a single column of the second intermediate matrix corresponding to the maximum diagonal element of the second intermediate matrix, wherein a number of columns to be estimated and scaled depends on a minimum of i) a number of transmitters of the second communication device, ii) a number of receivers of the first communication device, or iii) a predefined number smaller than the number of receivers of the first communication device.

In some embodiments, the method further includes compressing the first intermediate matrix using a plurality of Coordinate Rotation Digital Computer (CORDIC) processors, wherein the compression comprises, for each column of the first intermediate matrix, selecting at least two active CORDICs to rotate two complex elements of a column of the first intermediate matrix, estimating a respective angle of rotation for the two complex elements of the column of the first intermediate matrix required to remove an imaginary portion of the two complex elements, transmitting the estimated angles of rotations for the two complex elements of the column of the first intermediate matrix to a plurality of passive CORDICs, rotating, using the plurality of passive CORDICs, the remaining complex elements of the rows of the first intermediate matrix by respective angle of rotation estimated by the active CORDICs, estimating an angle between the respective real portions of the two complex elements, and rotating, using the plurality of passive CORDICs, the remaining real and imaginary elements of the rows of the first intermediate matrix by the respective estimated angle between the respective real portions of the two complex elements.

Embodiments described herein also provide a transceiver comprising a receiver having one or more integrated circuits configured to receive a data packet from a second communication device via a communication channel, process each of a plurality of tones of the received data packet to generate a compressed steering matrix corresponding to the communication channel, and construct, in parallel to the processing of the received plurality of tones, an immediate feedback packet comprising a plurality of data symbols, wherein the data symbols includes the generated compressed steering matrix. The transceiver further includes a transmitter having one or more integrated circuits configured to transmit at least a first data symbol of the immediate feedback packet, prior to completing the processing of all the plurality of tones of the received data packet, from the first communication device to the second communication device, the constructed data symbols being for use by the second communication device to steer at least one subsequent transmission to the first communication device.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
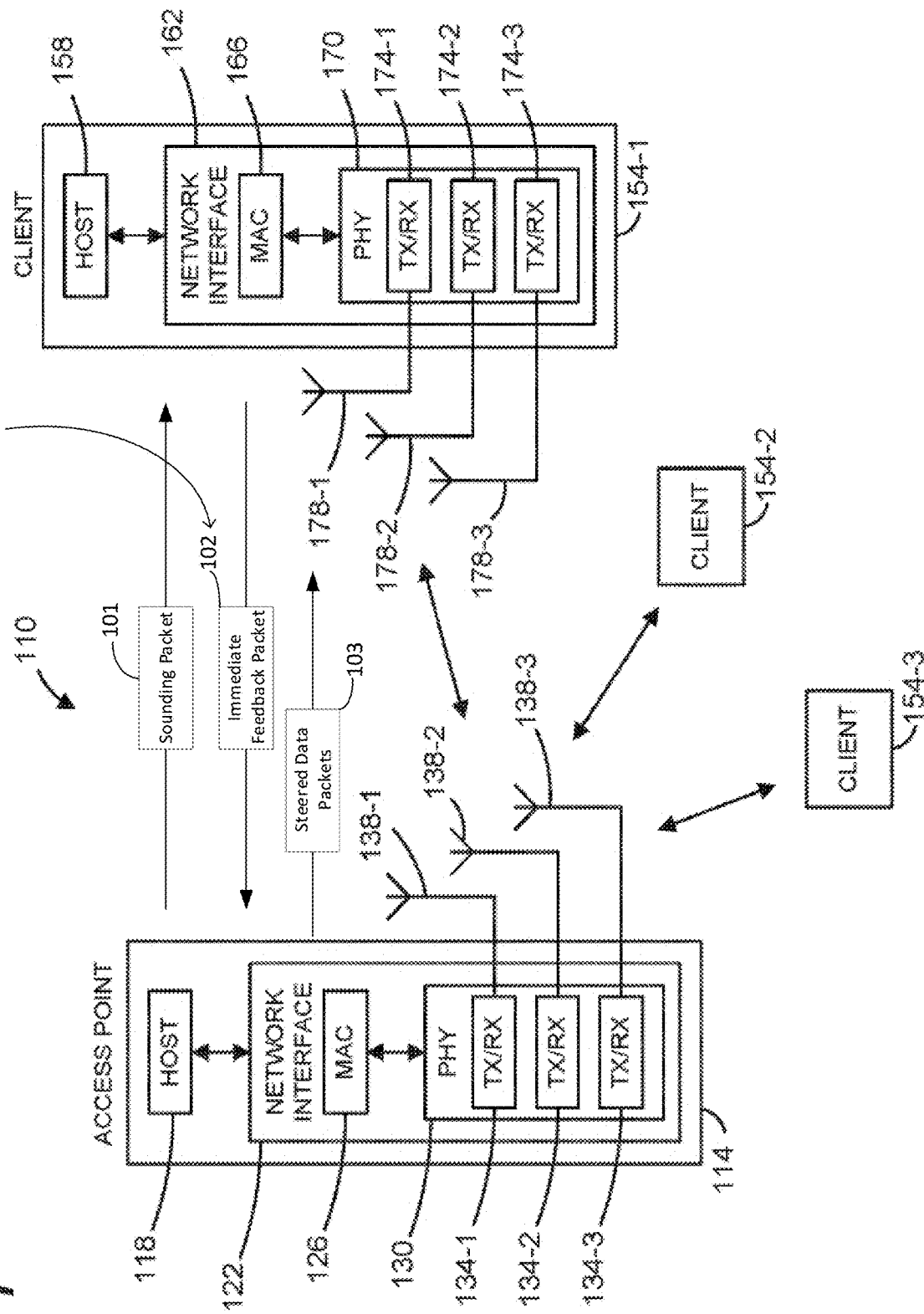
FIG. 1 is a block diagram of an example wireless local area network (WLAN) 100, in accordance with an embodiment.

As noted above, the present disclosure describes beamforming feedback techniques. For illustrative purposes, some embodiments of this disclosure are described in the context of a wireless local area network (WLAN) system that utilize protocols the same as or similar to protocols defined by the 802.11 standards from the Institute of Electrical and Electronics Engineers (IEEE). However, in other embodiments, the beamforming feedback techniques are used in other types of wireless or wired communication systems such as mobile communication networks (e.g., cellular networks), and the like.

In embodiments described below, a wireless network device such as an access point (AP) of a wireless local area network (WLAN) transmits data streams to one or more client stations. In some embodiments, the WLAN supports multiple input multiple output (MIMO) communication in which the AP and/or client stations include more than one antenna, thereby creating a plurality of spatial (or space-time) streams over which data can be transmitted simultaneously.

In an embodiment in which the AP employs multiple antennas for transmission, the AP uses two or more antennas to transmit the same signal while phasing (and amplifying) this signal as it is provided to the various transmit antennas to achieve beamforming or beamsteering. In order to implement a beamforming technique, the AP generally requires knowledge of certain characteristics of the communication channel (e.g., channel matrix, channel state information, channel estimate, and the like) between the AP and the one or more client stations for which a beamforming pattern is to be created.

To obtain channel characteristics, according to an embodiment, the AP transmits to a client station a sounding packet 101. The sounding packet 101 includes a number of training fields that allow the client station to accurately estimate the channel conditions (discussed below in greater detail with reference to FIG. 2). Specifically, the client station receives the sounding packet 101, determines channel characteristics, and subsequently transmits or feeds back, in some form, the determined channel characteristics to the AP. For example, channel characteristics information can be included in a management or a control frame transmitted to the AP. Upon receiving, from one or more of the client stations, information characterizing the corresponding communication channel, the AP generates desired beam patterns for use in subsequent transmissions to one or more client stations.

Considering the instability of channel conditions, which can quickly change, it is important to generate and send back the compressed steering matrix (CSM) to the AP as soon as possible. The channel state information (CSI) matrix is defined by the number of transmitter and receiver antennas. The size and precision of the CSI matrix increases with an increase in the number of antennas. However, the beamforming process becomes more complicated as the number of antennas increases (i.e., there is an increased need for processing power to generate the larger CSI (and CSM) matrix corresponding to the larger number of antennas).

As the constantly evolving new Wi-Fi standards (e.g., 802.11ac, 802.11ax) continue to increase the number of tones, the time period between receiving the sounding packet at the client stations and transmitting the feedback packet remains the same. This presents a significant challenge for the beamformee (i.e., a receiver) to process the CSM of each tone of the sounding packet and send the feedback packet back to the beamformer (i.e., transmitter) within a standard defined duration gap (Short Interframe Space (SIF) period) regardless of CSI configuration and signal bandwidth. The conventional approach to generating the CSM for the increasing number of tones has been to increase the number of processors operating on the received sounding packet in order to estimate the CSM of each tone within the available time. However, such an approach requires significantly greater number of processors and a larger circuit area to implement those processors. Another conventional approach to generating the CSM (and CSI) matrix has been to increase the beamformee circuit clock. However, such approaches also require a larger circuit area, greater power demands, and present additional synthesis challenges.

The present disclosure provides techniques for efficiently generating CSM estimation and transmitting the feedback packet including the CSM estimation to the AP in a timely manner without requiring additional processors for processing the increased number of tones. More specifically, in accordance with one implementation of the present disclosure, the AP (beamformer) sends a sounding packet (e.g., a null data packet) to the client stations (beamformees). The client stations process the respective null data packets to generate compressed steering matrices (CSM) that are sent back to the AP in an immediate feedback packet (IMF) 102. In an implementation in accordance with the present disclosure, the client stations process the received tones of the sounding packet in parallel with generating the data symbols of the feedback packet. That is, the client stations process the tones of the sounding packet 101 at a sufficiently fast rate to meet the data symbol requirement as specified for the feedback packet 102. Subsequently, the AP 114 transmits data packets 103 to the client station 154-1 based on the beam steering information included in the immediate feedback packet 102. The subject matter of this application will be described below with reference to FIGS. 1-8 discussed below.

FIG. 1 is a block diagram of an example WLAN 100 according to an embodiment. The WLAN 100 implements the efficient beamforming implementation techniques described herein. The WLAN 100 includes an access point (AP) 114 and a plurality of client stations 154 in an embodiment. Although three client stations 154 are illustrated in FIG. 1, the WLAN 100 includes other suitable numbers (1, 2, 4, 5, 6, etc.) of client stations 154 in various embodiments.

The AP 114 comprises a host processor 118 coupled to a network interface device 122. The network interface device 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 are three antennas 138 are illustrated in FIG. 1, the AP 114 includes other suitable numbers (1, 2, 4, etc.) of transceivers 134 and antennas 138 in other embodiments. In some embodiments, the AP 114 includes a higher number of antennas 138 than transceivers 134, and antenna switching techniques are used.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on chip (SoC), where the SoC includes at least a portion of the MAC processor 126 and at least a PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communications protocol and the PHY processor 130 may be configured to implement PHY functions, including PHY functions of the WLAN communications protocol. For instance, MAC processor 126 may be configured to generate MAC layer data units such as MAC service data units (MSDUs), MAC protocol data units (MPDUs), etc. and provide the MAC layer data units to the PHY processor 130.

The PHY processor 130 may be configured to receive MAC layer data units from the MAC processor 126 and encapsulate the MAC layer data units to generate the PHY layer data units such as PHY protocol data units (PPDUs) for transmission via the antennas 138. The PHY processor 130 includes circuitry (e.g., in the transceivers 134) configured to upconvert baseband signals to radio frequency (RF) signals for wireless transmission via the antennas 138.

Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units. The PHY processor 130 includes circuitry (e.g., in the transceivers 134) configured to downconvert RF signal received via the antennas 138 to baseband signals.

The client station 154-1 includes a host processor 158 coupled to a network interface device 162. The network interface device 162 includes a MAC processor 166 and a PHY processor 170. The PHY processor 170 includes a plurality of transceivers 174 and the transceivers 174 are coupled to a plurality of antennas 178. Although three transceivers 174 are three antennas 178 are illustrated in FIG. 1, the client station 154-1 includes other suitable numbers (1, 2, 4, etc.) of transceivers 174 and antennas 178 in other embodiments. In some embodiments, the client station 154-1 includes a higher number of antennas 178 than transceivers 174, and antenna switching techniques are used.

The network interface device 162 is implemented using one or more ICs configured to operate as discussed below. For example, the MAC processor 166 may be implemented, at least partially, on a first IC, and the PHY processor 170 may be implemented, at least partially, on a second IC. As another example, at least a portion of the MAC processor 166 and at least a portion of the PHY processor 170 may be implemented on a single IC. For instance, the network interface device 162 may be implemented using a system on chip (SoC), where the SoC includes at least a portion of the MAC processor 166 and at least a PHY processor 170.

In various embodiments, the MAC processor 166 and the PHY processor 170 of the client stations 154-1 are configured to generate data units, and process received data units, that conform to a WLAN communication protocol such as a communication protocol conforming to the IEEE 802.11 Standard or another suitable wireless communication protocol. For example, the MAC processor 166 may be configured to implement MAC layer functions, including MAC layer functions of the WLAN communications protocol and the PHY processor 170 may be configured to implement PHY functions, including PHY functions of the WLAN communications protocol.

The MAC processor 166 may be configured to receive MAC layer data units such as MSDUs, MPDUs, etc. and provide the MAC layer data units from the MAC processor 166 and encapsulate the MAC layer data units to generate the PHY layer data units such as PPDUs for transmission via the antennas 178. The PHY processor 170 includes circuitry (e.g., in the transceivers 174) configured to upconvert baseband signals to radio frequency (RF) signals for wireless transmission via the antennas 178.

Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units. The PHY processor 170 includes circuitry (e.g., in the transceivers 174) configured to downconvert RF signal received via the antennas 178 to baseband signals.

In an embodiment, each of the client stations 154-2 and 154-3 has a structure that is the same as or similar to the client station 154-1. Each of the client stations 154-2 and 154-3 has the same or a different number of transceivers or antennas. For example, the client station 154-2 and/or the client station 154-3 each have only two transceivers and two antennas (not shown), according to an embodiment.

In an embodiment, the AP 114 is configured to implement beamforming for transmissions to one or more client stations 154 using knowledge of characteristics of the communication channel between the AP 114 and client stations 154. To obtain knowledge of characteristics of a communication channel between the AP 114 and a client station 154 (e.g. the client station 154-1), in an embodiment, the AP 114 transmits known training signals to the client station 154-1. For example, in an embodiment, the AP 114 transmits a sounding packet to the client station 154-1, wherein the sounding packet includes one or more training fields (e.g., long training fields (LTF)) that include the training signals.

In an embodiment, the AP 114 transmits training signals to the client station 154-1 via a MIMO channel formed by the transmit antenna 138 and receive antenna 178. As will be described below with reference to FIG. 4, the channel state information is determined based on the received training signals at the PHY layer of the receiver of the client station 154-1. The client station 154-1 receives the training signals from the AP 114 and develops a channel description of the MIMO channel based on the training signals received from the AP 114. In an embodiment in which OFDM communication is used, the client station 154-1 determines a plurality of channel matrices $H_i$, respective ones of the channel matrices $H_i$ corresponding to respective OFDM tones (subcarriers) in the communication channel.

Based on the determined one or more channel matrices $H_i$ corresponding to respective OFDM tones (subcarriers), the client station 154-1 generates a compressed beamforming feedback to be transmitted to the AP 114. The compressed beamforming feedback includes information (e.g., angles) that represent the one or more steering matrices determined based on the one or more channel matrices $H_i$ in an embodiment.

As noted above, conventional methods employ a large number of processors to compute the plurality of channel matrices $H_i$ corresponding to each of the respective OFDM tones (subcarriers) and transmit the feedback packet with the channel information within the specified time period. However, the present disclosure discloses techniques for efficient transmitting the feedback packet including channel information to the AP 114 without requiring additional processors. Specifically, the IMF packet first transmits its own preamble before its data symbol that include CSM as a payload of the IMF packet along with MAC control header. The size of the data symbols of the IMF packet are a function of a number of data bits per symbol (Ndbps) specified in the Modulation and Coding Scheme (MCS) for a particular signal packet type, number of streams, and bandwidth. Therefore, by the time the transmitter 174 of the client station 154-1 is required to transmit the first data symbol of the IMF packet (as defined by the corresponding Standard), the client station 154-1 (beamformee) does not need to finish the processing all of the OFDM tones of the sounding packet 101. Instead, the client station 154-1 only needs to process a sufficient number of tones to accumulate enough bits to match the Ndbps of the first data symbol. The subsequent data symbols of the IMF packet require the same Ndbps amount of data from the client station 154-1 (generated by processing the plurality of OFDM tones of the sounding packet).

In some embodiments, IMF symbols are transmitted every Ops (e.g., in IEEE 802.11n, 802.11g, and 802.11ac Wi-Fi Standards) or every 13.6 µs (e.g., in IEEE 802.11ax Standard). Accordingly, when the client station 154-1 maintains a CSM processing rate to construct each data symbol of the IMF packet as specified by the Ndbps, the client station 154-1 can continue processing the OFDM tones in parallel with the IMF packet generation. In an embodiment, the client station 154-1 estimates the minimum number of bits generated in the IMF data symbol duration time. If this estimated value is more than the Ndbps of the IMF packet, the client station 154-1 can continue the parallel processing of the OFDM tones of the sounding packet and the IMF data symbol generation. In some implementations, given the finite amount of null data packet tones and that the client station 154-1 can begin processing the OFDM tones of the null data packet prior to constructing the IMF packet, the beamformee processing rate is lower than the Ndbps.

The beamformer begins receiving beamforming feedback data from the beamformee that has been calculated based on the training signals sent with the sounding packets to the beamformee. The beamformer subsequently begins transmitting additional packets to the beamformee using beamforming feedback data obtained based on the sounding packet.

Figure 2:
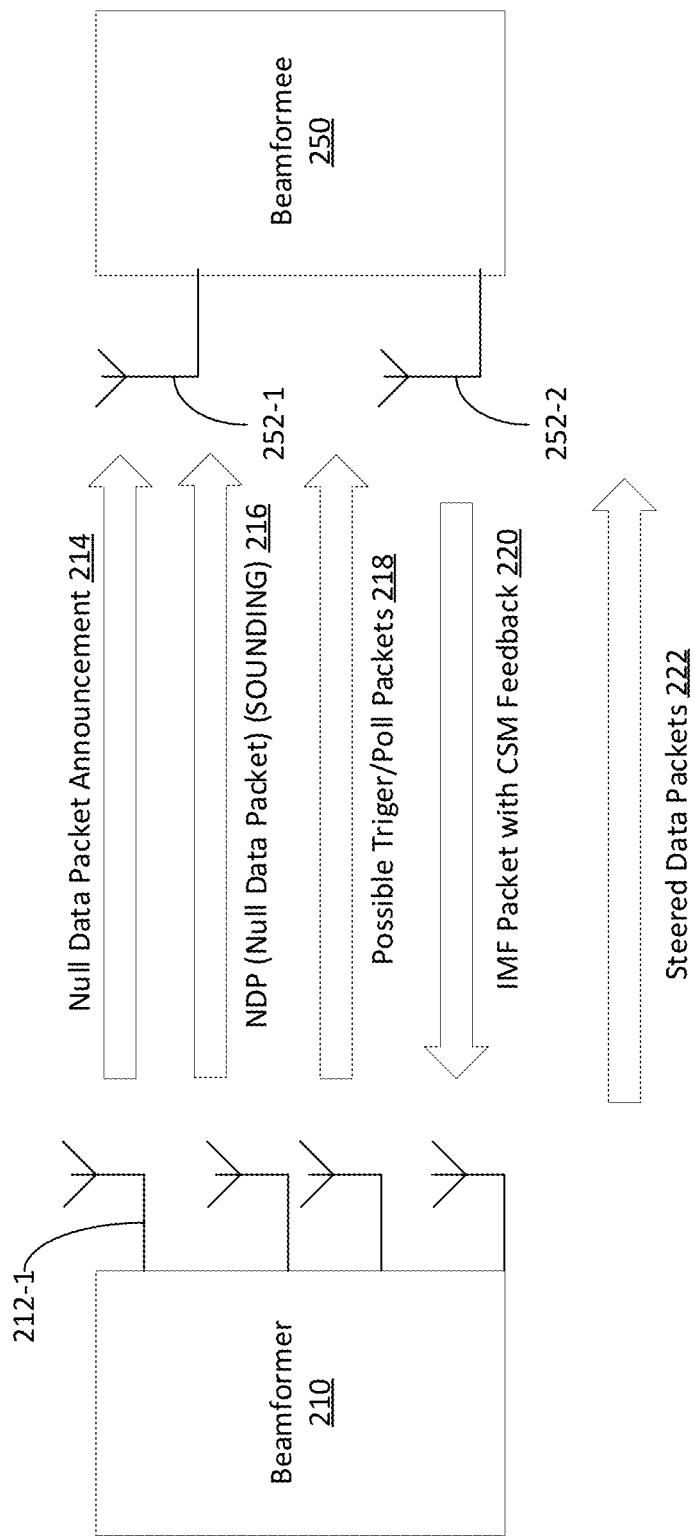
FIG. 2 is a block diagram illustrating data packet flow within a wireless local area network (WLAN) 100, in accordance with the embodiment.

FIG. 2 shows a block diagram illustrating the data packet flow within a wireless local area network (WLAN) 100. A beamformer 210 (e.g., AP 114) having a plurality of antennas 212 (e.g., antennas 138) transmits a null data packet announcement 214 to a beamformee 250 (e.g., client station 154-1). The null data packet announcement 214 is received by a plurality of antennas 252 (e.g., antennas 178) of the beamformee 250. Following the null data packet announcement 214, the beamformer 210 transmits a null data packet 216 (e.g., a sounding packet 101) to the beamformee 250. In some Wi-Fi Standards which support multi-user (MU) mode, the AP 114 sends the null data packet 216 to all relevant beamformees and then collects feedback with corresponding CSM. In an embodiment, this feedback is sent by all the users simultaneously with a trigger packet 218 or sequentially via a poll packet 218.

The beamformee 250 begins to process each tone of the received null data packet 216 and generate data symbols of the IMF packet 220 in parallel. The IMF packet 220 having CSM information is transmitted from the beamformee 250 to the beamformer 210. Once the beamformer 210 receives data symbols of the IMF packet 220, the beamformer 210 begins transmitting steered data packets 222 based on the CSM information included in the IMF packet 220. In an implementation where multiple client stations 154 have transmitted the respective IMF packets, the beamformer 210 combines the IMF from the different client stations.

Figure 3:
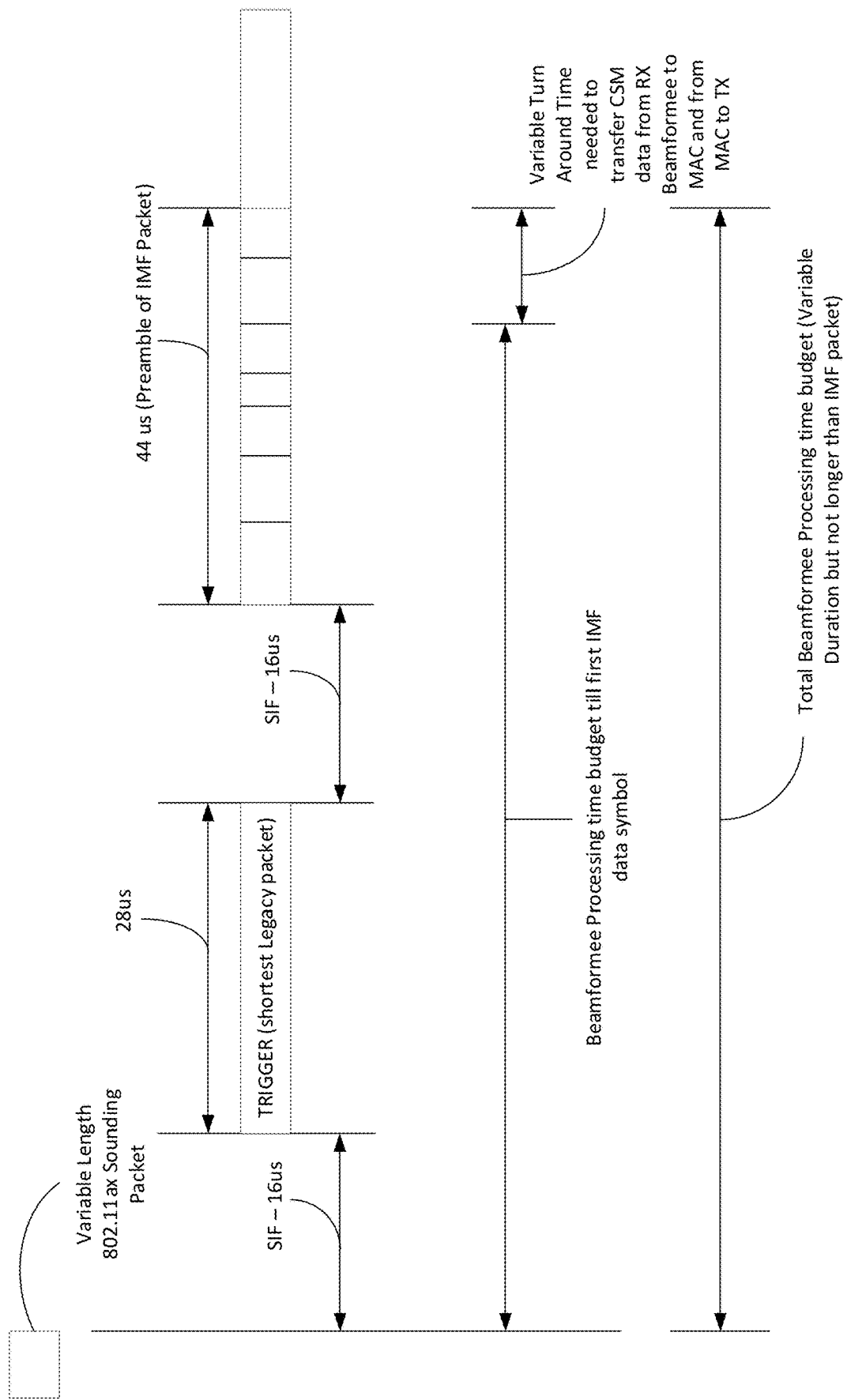
FIG. 3 is an example timing diagram showing a beamforming processing time budget within a wireless local area network (WLAN) 100 according to an embodiment of FIG. 1.

FIG. 3 illustrates a timing diagram showing a beamforming processing time budget within a wireless local area network (WLAN) 100 according to an embodiment. As shown in FIG. 3, in an implementation, once the beamformee (e.g., client station 154-1) receives a variable length null data packet (e.g., 802.11ax packet), the beamformee has a Short Interframe Space Period (SIF) of approximately 16 µs before needing to send a reply back to the beamformer (e.g., AP 114). In addition to the null data packet, a trigger packet of a minimum length is also sent to the beamformee (as required by the 802.11ax Standard). This may provide an additional 28 µs (time needed to receive the trigger packet) for the beamformee to process the received OFDM tones with the null data packet. As mentioned above, the IMF packet includes its own preamble which is sent prior to its payload containing the CMS information. As shown in FIG. 3, the preamble of the IMF packet includes a legacy preamble portion (L-STF, L-LTF, and L-SIG) followed by a High Efficiency Preamble portion (RL-SIG, HE-SIGA, HE-STF, and HE-LTF)s. As shown in FIG. 3, in an embodiment, it takes approximately 44 µs to transmit the preamble portion of the IMF packet.

Therefore, the beamformee has approximately 104 µs time budget (16 µs SIF+28 µs Trigger packet+16 µs SIF+44 µs IMF preamble) to construct the first data symbol of the IMF packet in an embodiment where an 802.11ax variable length sounding packet is received. As will be explained below with reference to FIG. 4, the beamformee may require some additional time to transfer CSM data from its receiver to a MAC layer and from the MAC layer to the beamformee transmitter.

In sequential mode (where IMF packets are received sequentially from the multiple client stations), the beamformee of the non-first user does not need to provide data by the time of the first feedback of the sounding process. In case of trigger-based sounding (such as in IEEE 802.11ax), the available beamformee processing time budget is also increased, and it depends on the variable duration trigger frame. This varies the available time budget for beamformee processing till the required data portion of the first data symbol of its own IMF packet. Furthermore, the feedback packet type can also be variable and with variable preamble duration that depends on the transmitter and stream configuration. Therefore, it is quite challenging to estimate available time budget for beamformee processing when the null data packet, the trigger/poll packet, and IMF packets are all of variable duration.

Figure 4:
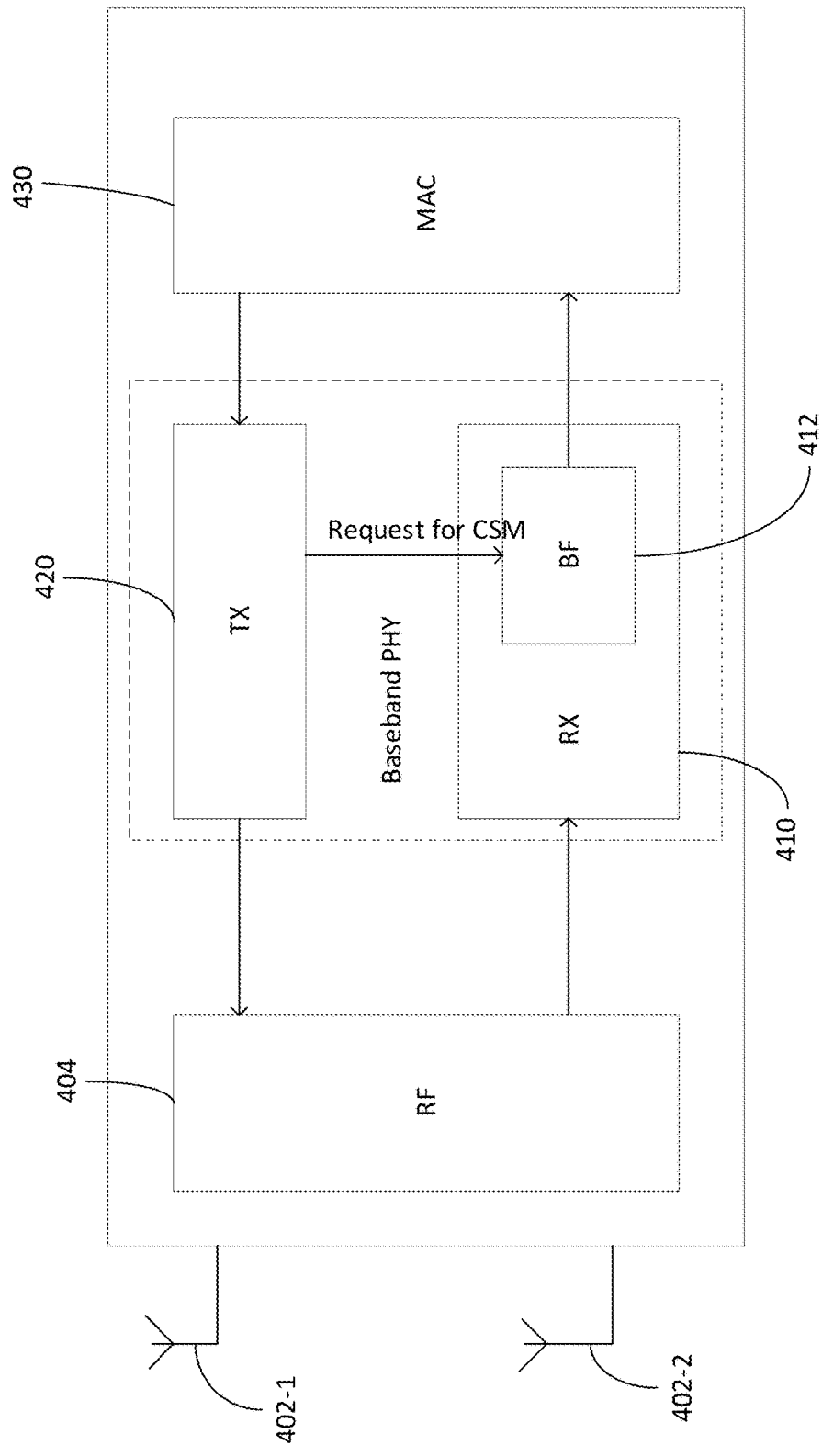
FIG. 4 is a block diagram of an example beamformee circuitry 400 within a wireless local area network (WLAN) 100, in accordance with an embodiment.

FIG. 4 illustrates a block diagram of an example beamformee 400 according to an embodiment. Beamformee 400 (similar to client station 154 and beamformee 250) includes a pair of antennas 402 (similar to antennas 178 and 252). The beamformee 400 also includes a Radio Frequency (RF) circuitry 404, a receiver (RX) circuitry 410, a transmitter (TX) circuitry 420, and a Media Access Control (MAC) circuitry 430. In addition, the RX circuitry 410 includes a beamformee (BF) circuitry 412 provided at the wireless receiver Physical layer. The BF circuitry 412 performs the CSM matrix estimation based on the OFDM tones received at the RX circuitry 410. Moreover, the BF circuitry 412 is configured to provide sufficient data (in terms of Ndbps) to its own TX circuitry 420 (after adding MAC MIMO control header) to construct the first symbol of the IMF data packet).

As discussed above, because the null data packet, the trigger/poll packet, and IMF packets all have variable durations, estimating the available time budget requires massive computing power resulting in increased circuit area and use of a greater number of processors to meet the time budget requirements. However, in an embodiment in accordance with FIG. 4, the BF circuitry 412 of the RX circuitry 410 does not need to know the available time budgets of all possible configurations. Instead, the TX circuitry 420 sends a request to the BF circuitry 412 before the first data symbol of the IMF packet is to be transmitted. As mentioned above, the BF circuitry 412 does not needs to finish processing all of the received OFDM tones. Instead, the BF circuitry 412 needs to have accumulated a sufficient number of bits to cover Ndbps of the first data symbol in order to maintain the specified IMF MCS rate. By generating feedback based on a quantity of bits sufficient to cover the Ndbps of the first data symbol, the processing at the BF circuitry 412 is simplified as the BF circuitry 412 is not required to estimate the available time budgets in addition to processing the received tones. Beamforming may also be implemented in an implicit mode while processing data packets, in accordance with some embodiments. Specifically, the beamformee estimates the Steering Matrix (SM) from the flipped CSI matrix considering the reciprocal channel. In implicit mode, the beamformee does not need to send an IMF packet. Instead, the beamformee provides the SM to its own transmitter for steering to the device from which the Beamformee received the data packet.

The SM is estimated from LTF training sequence of the preamble of the received null data packet or data packets using different algorithms. Most of the conventional algorithms initially generate the SM followed by compression operation for each tone of the null data packet (or data packet). The BF circuitry 412 operation consists of processing CSI matrix (also known as H matrix) that could be divided into an initial H matrix preprocessing operation followed by a compression operation. The processing duration of each tone is dependent on the dimension of the initial CSI matrix. H matrix size is defined by Ntx×Nrx. In an embodiment, the larger the dimension of the H matrix, the more accurate channel estimate is. However, the processing of each tone of the entire signal bandwidth requires significantly more hardware resources as the number of transmitters and receivers increases. Moreover, the number of tones that need to be processed in the beamformee time budget increases with an increase in Wi-Fi signal bandwidth, in accordance with an embodiment of the present disclosure.

As will be discussed below with reference to FIGS. 5 and 6, the present disclosure presents techniques for efficiently performing QR processing (a known method for generating CSM for a channel) for CSM generation by performing the QR processing per each tone sequentially in order to reduce hardware usage.

Figure 5:
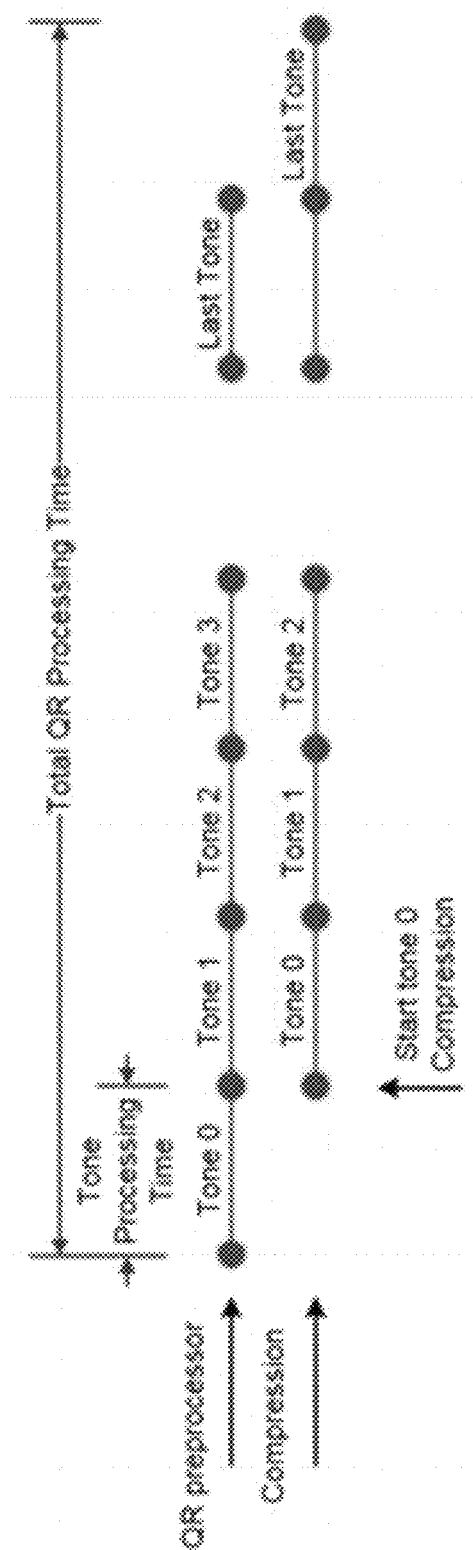
FIG. 5 is an example timing diagram showing tone processing and compression at a beamformee 400 in accordance with an embodiment.

FIG. 5 is an example timing diagram showing tone processing and compression according to an embodiment. Given the described parallel approach for beamformee processing and IMF packet generation, the present disclosure provides a technique for using a signal beamformee preprocessor and compressor running sequentially tone by tone for the entire signal bandwidth. Specifically, the preprocessor and compression algorithms are pipelined for each tone that allows essential beamformee area optimization. As shown in FIG. 5, the QR preprocessor and compression algorithms operate in parallel such that when tone 0 is being compressed, tone 1 is being preprocessed. This parallel processing structure helps reduce the processor hardware required to process the received tones and construct the IMF packet.

Figure 6:
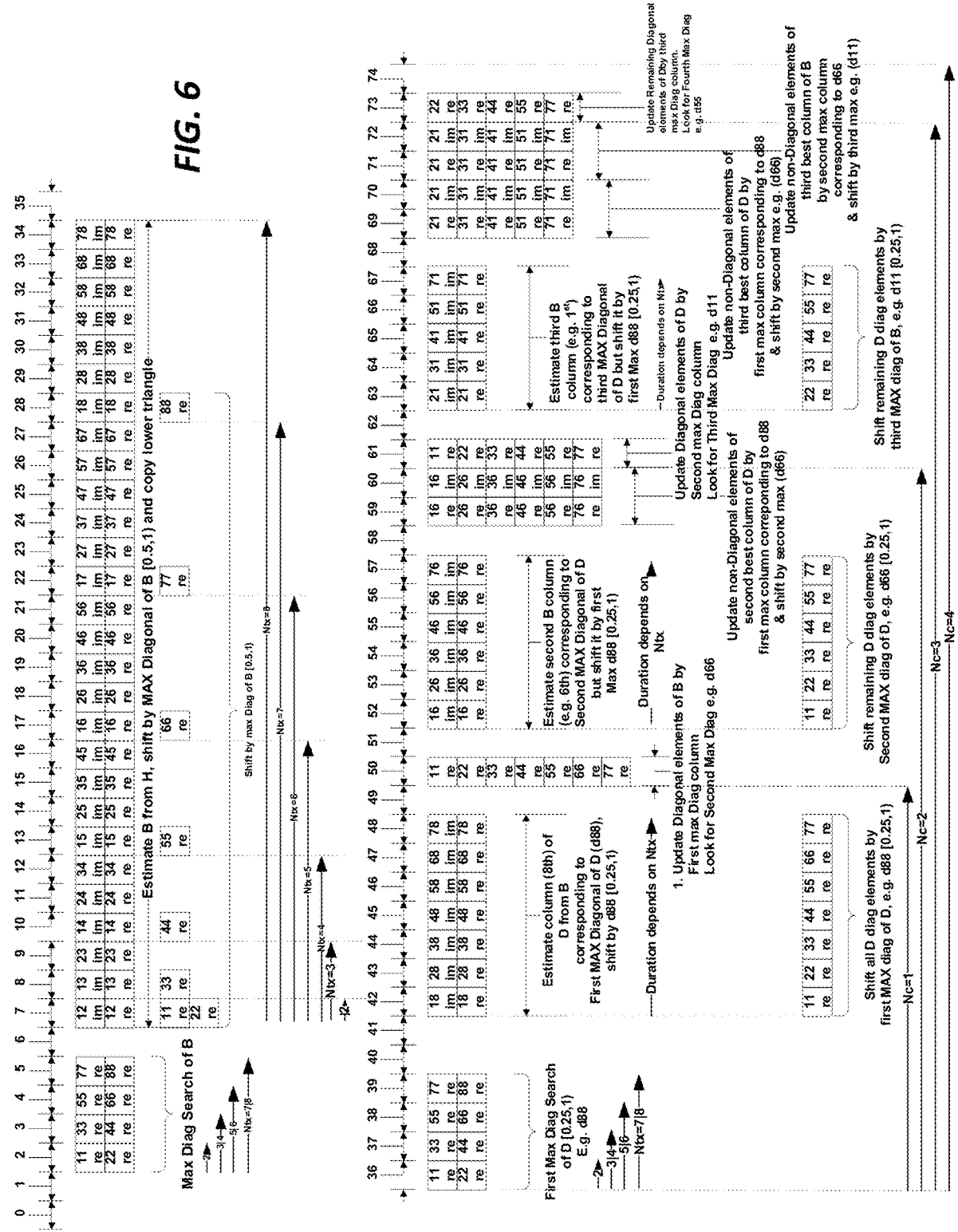
FIG. 6 shows a compressed steering matrix preprocessing operation being performed at the beamformee 400 in accordance with an embodiment.

FIG. 6 shows a compressed steering matrix preprocessing operation performed at the beamformee 400 in accordance with an implementation of the subject matter of this disclosure. In explicit mode (i.e., where non-data null data packets are transmitted), CSM matrix dimensions are defined by number of rows (NR) and columns (NC) where NR is equal to the number of non-legacy LTFs of NDP (normally equal to the number of TX antennas of beamformer) and NC is equal to the min(NR, Number of receive antennas (NRX) or another set value (smaller than NRX)). NC is also considered to be equal to the number of streams used by the beamformer in the steered packet following the sounding, in accordance with an embodiment. In an embodiment, the number of bits that are produced after processing a tone is reduced with smaller CSM configurations. Therefore, the BF circuitry 412 scales the duration of each tone processing according to the configuration of antennas and selected streams in order to maintain beamformee processing rate to match the Ndbps of the IMF packet, in accordance with the present disclosure.

Since smaller CSM matrix configurations produce smaller number of angles and bits for each tone, the BF circuitry shortens the processing time of each tone to maintain the desired IMF packet generation rate, in accordance with an embodiment. In accordance with an embodiment of the present disclosure, the QR preprocessing algorithm is modified by making it scalable by estimating the intermediate matrix needed only for a particular CSM configuration.

Conventional QR preprocessing algorithms require estimation of an intermediate B matrix obtained by determining a product of the channel matrix H and a Hermitian transpose of the channel matrix. The resulting B matrix is an initial input to the compression operation after finding and sorting the most orthogonal columns of the B matrix. Specifically, the most orthogonal columns of the B matrix are found by multiplying the B matrix and a Hermitian transpose of the B matrix to obtain a D matrix. Given that current Wi-Fi standards support up to 8 transmitters and 8 receivers, the QR preprocessor needs to estimate up to 64 complex elements for the B matrix and then process up to another 64 complex elements of the D matrix at each of stage of sorting the B matrix, thus requiring significant hardware resources to meet the IMF packet generation time constraints. A person skilled in the art will appreciate that as Standards evolve, a greater number of transmitters and receivers may be supported, thereby only exaggerating the drawbacks of the conventional approaches.

In contrast, the present disclosure provides techniques for reducing the preprocessing resources required by providing a scalable implementation method. Specifically, in an embodiment, the BF circuitry 412 initially estimates only the maximum diagonal elements of the B matrix and then estimates the upper triangular elements based on scaling by the maximum diagonal value of the D matrix. The number of diagonal elements to be estimated depends on the number of transmitters, Ntx. Therefore, the amount of processing required is scalable based on the number of transmitters and the preprocessor can process each tone faster as the number of the transmitters is reduced, in accordance with an implementation. Specifically, instead of having to derive all of the elements of D matrix (can be up to 64 complex elements in an 8×8 configuration) as required in conventional QR preprocessing algorithms, embodiments of the present disclosure reduce the computational load by estimating only the maximum diagonal value of the D matrix. Accordingly, the BF circuitry 412 is able to provide IMF packet data symbols in the available time budget by reducing the number of complex elements to be estimated.

Once the BF circuitry 412 estimates the B matrix (e.g., 8×8 dimension in accordance with one embodiment), the BF circuitry 412 sorts the columns of the estimated B matrix so that they are most orthogonal to each other. In an embodiment, this sorting step is performed by estimating the elements of the D matrix. Specifically, the BF circuitry 412 searches for the strongest diagonal elements of the D matrix, where diagonal and non-diagonal elements are updated as follows:

$$D_{ii} = (D_{kk}D_{ii} - |D_{ik}|^2) \text{-diagonal}$$

$$D_{ij} = (D_{kk}D_{ij} - D_{ik}D_{jk}^*), \text{*Hermitian}$$

where $D_{kk}$ is the maximum diagonal element.

Similar to the B matrix, the main diagonal elements of the D matrix are scalable to the number of transmitters. In contrast to the conventional approach where all of the elements of the D matrix are estimated and updated, only the column elements of the D matrix corresponding to the maximum diagonal elements are estimated and updated.

In embodiments in accordance with the present disclosure, the preprocessor skips unnecessary steps depending on the configuration. After scalable B matrix estimation, the BF circuitry 412 estimates the maximum diagonal element of D matrix. However, once the first maximum diagonal element of D is found (e.g. $d_{88}$), the BF circuitry 412 updates (and scales) only the corresponding ($8^{th}$) column and the remaining diagonal elements of the D matrix instead of the entire D matrix. The update operation is accomplished using the same core engine in a single clock cycle. If more than one column is needed for CSM, the BF circuitry 412 estimates the second maximum diagonal element of the D matrix (e.g. $d_{66}$). The BF circuitry 412 then estimates the corresponding (e.g. $6^{th}$) column of D matrix from the B matrix and scales this column by the first maximum element of the D matrix (e.g. $d_{88}$), in accordance with an embodiment. After that, the BF circuitry 412 updates the second best (e.g. $6^{th}$) column in one clock cycle and scales it by the second max diagonal element (e.g. $d_{66}$), in accordance with an embodiment.

Similar approach is used for the third best column estimation and so on as shown in FIG. 6.

As mentioned, the present disclosure avoids re-estimating the entire D matrix at each step, but only updates the columns corresponding to the maximum diagonals of the D matrix (as well as main diagonal update). Once the D matrix is processed, the BF circuitry 412 selects only the strongest columns of the B matrix in the order of maximum diagonal elements of the D matrix. Therefore, in accordance with some implementations, by reducing the number of columns of the B matrix that are processed, the processing time for each tone is also reduced. In an embodiment, this approach is more efficient for matrices in which the number of columns of CSM (Nc) is smaller than number of columns of D (and B) matrices.

The BF circuitry 412 first estimates the maximum diagonal elements of the B matrix. Following that, the BF circuitry 412 estimates all the remaining upper-triangular complex elements of the D matrix while scaling by the max diagonal element. The duration of the B matrix estimation is variable according to the number of transmitters as described above. In an embodiment having an 8×4 configuration, it takes 35 clock cycles to complete the B matrix estimation with 2 engines. Then, the BF circuitry 412 estimates the 4 columns of D matrix following the optimized approach of estimating only the necessary columns as described above. As shown in FIG. 6, $d_{88}$, $d_{66}$, $d_{11}$ and $d_{55}$ as determined to be the "best" 4 diagonal elements of the D matrix.

Once QR preprocessing of a tone is completed, the BF circuitry 412 applies CSM tone compression to produce φ and ψ angles of a particular Wi-Fi codebook. The compression algorithm consists of typical Givens rotations of the B matrix columns generated by the preprocessor. The Givens rotations are normally performed with Coordinate Rotation Digital Computer (CORDIC) algorithm of certain number of CORDIC iterations.

Figure 7:
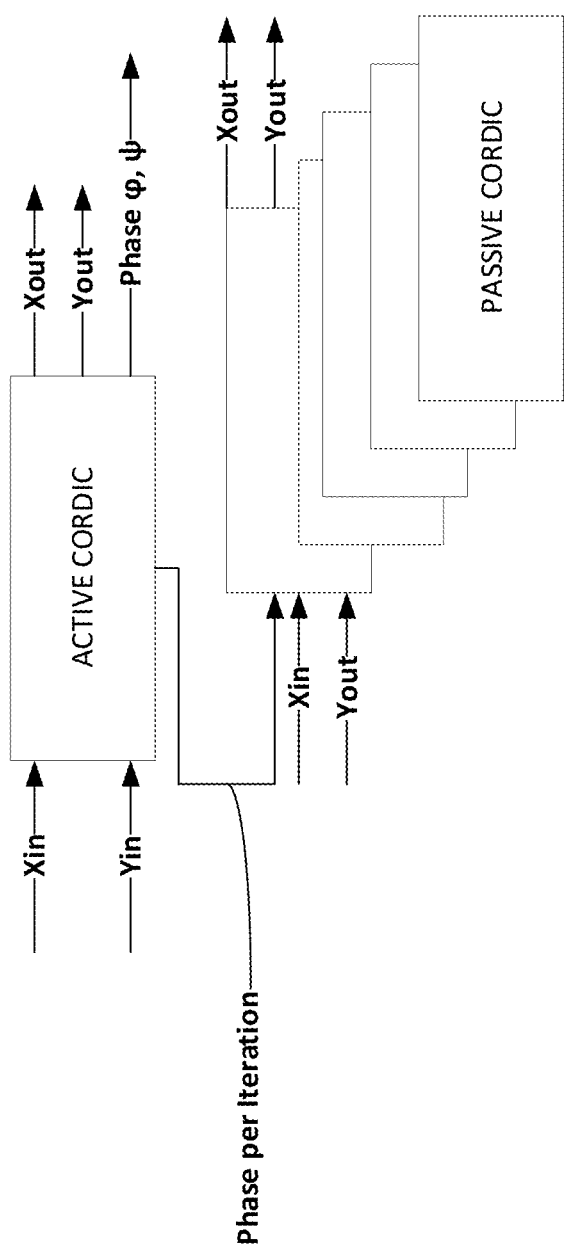
FIG. 7 shows an arrangement of Coordinate Rotation Digital Computer (CORDIC) circuitry used to perform a compression operation at the beamformee 400 in accordance with an embodiment.

FIG. 7 shows an arrangement of Coordinate Rotation Digital Computer (CORDIC) circuitry used to perform the compression operation at the beamformee 400 in accordance with an implementation of the subject matter of this disclosure. In an embodiment, in order to estimate the φ and ψ angles, the BF circuitry 412 divides the available CORDIC circuitry into two groups—"active" and "passive" CORDICS. As shown in FIG. 7, active CORDICs, in addition to estimating the CORDIC rotation phase at each CORDIC iteration for itself, also provide the estimated rotation phase to the corresponding passive CORDICs. In an embodiment, the estimation of compressed angles of the B matrix has a sequential nature, e.g. it is necessary to estimate $\varphi_{11}$ and $\varphi_{21}$ angles before estimating $\psi_{21}$. The complex elements $B_{11}$ and $B_{21}$ have to be rotated so that their imaginary parts are equal to zero before their real parts are used to estimate the angle between them ($\psi_{21}$). Considering similar dependency for all required angles, the BF circuitry 412 schedules the compression processing with an optimal number of CORDIC circuitry.

It is noted that the number of columns of the B matrix (that correspond to the number of streams of the future steered packet) can never be larger than the number of its rows (that correspond to the number of TX antennas). On the other hand, the number of columns of B can be smaller than number of rows in the B matrix because the number of streams cannot exceed the number of TX antennas.

Figure 8:
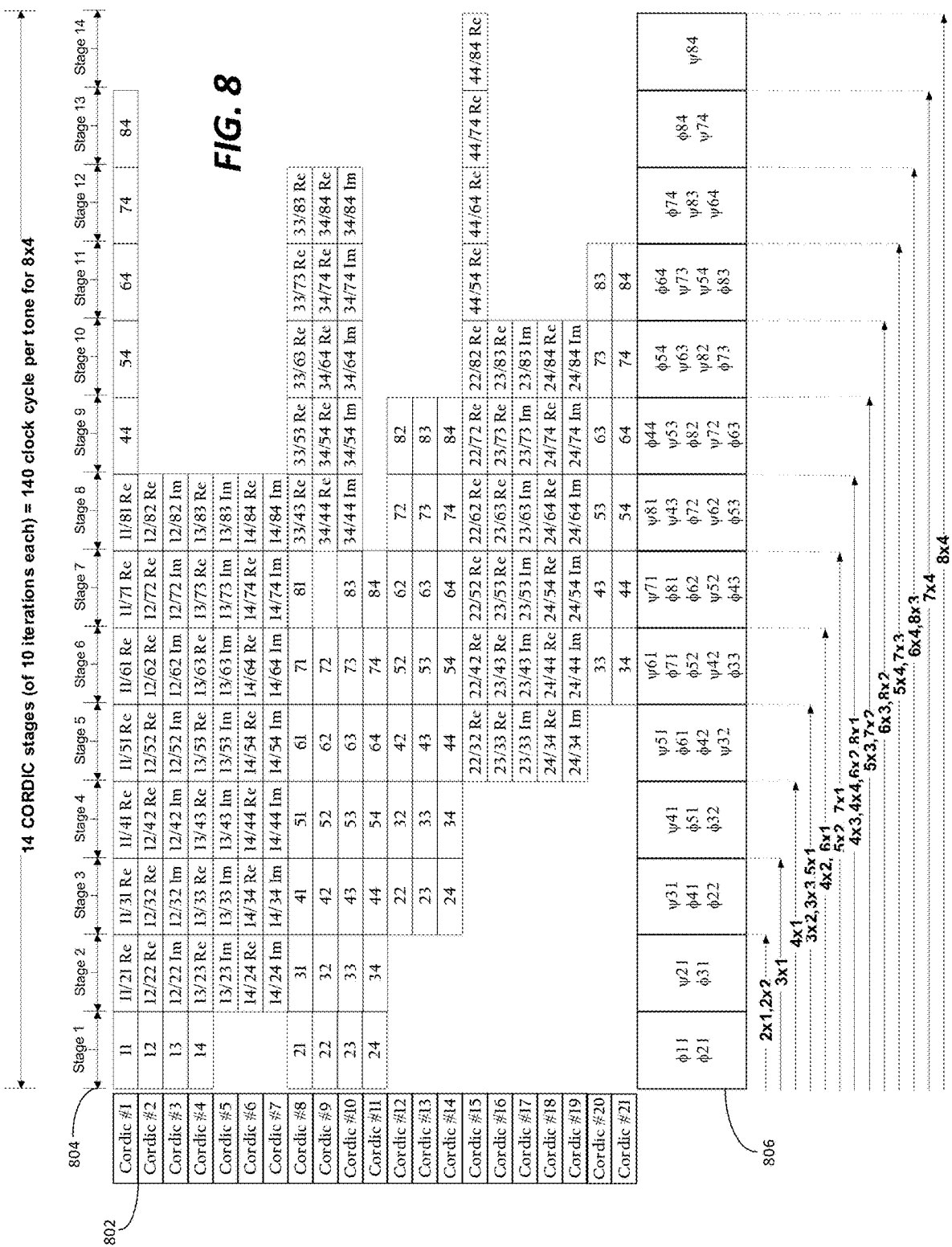
FIG. 8 shows a compression operation being implemented using CORDICs at a beamformee 400 in accordance with an embodiment.

FIG. 8 shows a compression operation being performed at the beamformee 400 in accordance with an implementation of the subject matter of this disclosure. Specifically, a method of compression of a B matrix having 8 rows and 4 columns (i.e., 8 transmitters and 4 streams) is performed using a total of 21 CORDICs 802. The entire compression is divided into 14 CORDIC stages 804 where each stage consists of, for example, 10 CORDIC iterations resulting in a maximum of 140 clock cycles per tone. In the implementation shown in FIG. 8, CORDICs #1, #8, #12, #15, and #20 are active while the remaining CORDICS are passive. In order to support a parallel and efficient utilization of all available CORDICs 802, the BF circuitry 412 selects two active CORDIC circuitry per Steering Matrix (SM) column. As shown in FIG. 8, active CORDICs #1 and #8 are used for first stream compression while active CORDICS #12 and #15 are used for stream two. Stream three needs only one more active CORDIC (#20) because CORDIC #8 becomes free at stage 8 when it estimates the last $\varphi_{81}$ angle of the first column. Similarly, the fourth stream can reuse active CORDICs #1 and #15 once it becomes free for first and third columns correspondingly.

At stage 1, active CORDICs #1 and #8 rotate two complex elements $B_{11}$ and $B_{21}$ of the first column (first and second row) making them real. The rotation results in $\varphi_{11}$ and $\varphi_{21}$ estimation (shown at 806). Other complex elements of the first row ($B_{12}$, $B_{13}$, $B_{14}$) and of the second row ($B_{22}$, $B_{23}$, $B_{24}$) are rotated using passive CORDIC circuitry (#2-#4 and #9-#11) by angles $\varphi_{11}$ and $\varphi_{21}$ correspondingly. At stage 2, active CORDIC #1 estimates $\psi_{21}$ angle between real $B_{11}$ and $B_{21}$. This rotation controls all passive CORDIC circuitry (#2 to #7) while rotating all the remaining real and imaginary elements of the first two rows. This stage is final for B configuration 2×1 and 2×2—thus compression of a tone stops to match preprocessor scalable rate of this configuration, in accordance with one embodiment. At the same time, CORDIC #8 rotates the following first column element $B_{31}$ producing angle $\varphi_{31}$. Passive CORDIC circuitry (#9-#11) rotate all the remaining complex elements of the third row by $\varphi_{31}$.

At stage 3, active CORDIC #1 estimates $\psi_{31}$ (with all corresponding rotation of first and third row complex elements by passive CORDICs (#2 to #7)). This stage is final for an embodiment having a 3×1 configuration. Therefore, in accordance with an implementation having a 3×1 configuration, compression is stopped to match preprocessor scalable rate of this configuration. Meanwhile, CORDIC #8 estimates $\varphi_{41}$ (with all corresponding fourth row rotation using passive CORDICs (#9-#11). Moreover, complex element $B_{2×2}$ is also available at this stage. This is the second element of the main diagonal of B that is associated with the second column of B. Active CORDIC #12 rotates $B_{22}$ making it real and estimating $\varphi_{22}$. The remaining complex elements $B_{23}$ and $B_{24}$ are rotated by the same angle $\varphi_{22}$ using passive CORDIC circuitry #13 and #14.

At stage 4, active CORDIC #1 estimates $\psi_{41}$ (with all corresponding rotation of first and fourth row complex elements by passive CORDICs (#2 to #7)) so this stage is final for 4×1 configuration in accordance with an embodiment. Therefore, in an implementation having a 4×1 configuration, compression is stopped to match preprocessor scalable rate of this configuration. Active CORDIC #8 estimates $\varphi_{51}$ (with all corresponding fifth row rotation using passive CORDICs (#9-#11). Active CORDIC #12 rotates $B_{32}$ making it real and estimating $\varphi_{32}$. The remaining complex elements of the third row are rotated by the same angle using passive CORDIC circuitry #13 and #14.

At stage 5, active CORDIC #1 estimates $\psi_{51}$ (with all corresponding rotation of first and fifth row complex elements by passive CORDICs (#2 to #7)) so this stage is final for 5×1 configuration in accordance with an embodiment. Therefore, compression is stopped to match preprocessor scalable rate of this configuration. Active CORDIC #8 estimates $\varphi_{61}$ (with all corresponding sixth row rotation using passive CORDICs (#9-#11). Active CORDIC #12 rotates $B_{42}$ making it real and estimating $\varphi_{42}$. The remaining complex elements of the fourth row are rotated by the same angle using passive CORDICs #13 and #14. Active CORDIC #15 switches on to estimate $\psi_{32}$ using previously made real $B_{22}$ and $B_{32}$. (Passive CORDICs #16-#19 rotate the remaining complex elements of second and third row.) Therefore, this stage is also final for configuration 3×2 and 3×3 so compression should stop to match preprocessor scalable rate of this configuration.

At stage 6, all CORDIC circuitry are enabled. Active CORDIC #1 estimates $\psi_{61}$ (with all corresponding rotation of first and sixth row complex elements by passive CORDICs (#2 to #7)) so this stage is final for 6×1 configuration. The compression is stopped to match preprocessor scalable rate of this configuration. Active CORDIC #8 estimates $\varphi_{71}$ (with all corresponding seventh row rotation using passive CORDICs (#9-#11). Active CORDIC #12 rotates $B_{52}$ making it real and estimating $\varphi_{52}$. The remaining complex elements of the fifth row are rotated by the same angle using passive CORDICs #13 and #14. Active CORDIC #15 estimates $\psi_{42}$. (Passive CORDICs #16-#19 rotate the remaining complex elements of second and fourth row.) Therefore, this stage is also final for configuration 4×2 so compression should stop to match preprocessor scalable rate of this configuration. This is also a stage when complex element $B_{3\times3}$ is available. This is the third element of the main diagonal of B that is associated with the third column of B. Therefore, active CORDIC #20 rotates $B_{33}$ making it real and estimating $\varphi_{33}$. The remaining complex elements $B_{34}$ is rotated by the same angle $\varphi_{33}$ using passive CORDIC #21

At stage 7, active CORDIC #1 estimates $\psi_{71}$ (with all corresponding rotation of first and seventh row complex elements by passive CORDICs (#2 to #7)) so this stage is final for 7×1 configuration. The compression is stopped to match preprocessor scalable rate of this configuration. Active CORDIC #8 estimates $\varphi_{81}$ (with all corresponding eighth row rotation using passive CORDICs (#9-#11). Active CORDIC #12 rotates $B_{62}$ making it real and estimating $\varphi_{62}$. The remaining complex elements of the sixth row are rotated by the same angle using passive CORDICs #13 and #14. Active CORDIC #15 estimates $\psi_{52}$. (Passive CORDICs #16-#19 rotate the remaining complex elements of second and fifth row.) Therefore, this stage is also final for configuration 5×2 so compression should stop to match preprocessor scalable rate of this configuration. Active CORDIC #20 rotates $B_{43}$ making it real and estimating $\varphi_{43}$. The remaining complex element of the fourth row ($B_{44}$) is rotated by the same angle using passive CORDIC #21.

At stage 8, active CORDIC #1 estimates $\psi_{81}$ (with all corresponding rotation of first and eighth row complex elements by passive CORDICs (#2 to #7)). Therefore, this stage is final for 8×1 compression, and the compression is stopped to match preprocessor scalable rate of this configuration. Since all $\varphi$ angles of the first column were already estimated so active CORDIC #8 is now free. Therefore, the active CORDIC #8 is reused to help estimate $\psi$ angles of the third column. Active CORDIC #8 estimates $\psi_{43}$ using previously made real $B_{33}$ and $B_{43}$ (with all corresponding third and fourth row rotation using passive CORDICs #9-#10). (CORDIC 11 can be switched off.) Therefore, this stage is also final for configuration 4×3 and 4×4. Therefore, compression should stop to match preprocessor scalable rate of this configuration. Active CORDIC #12 rotates $B_{72}$ making it real and estimating $\varphi_{72}$. The remaining complex elements of the seventh row are rotated by the same angle using passive CORDIC circuitry #13 and #14. Active CORDIC #15 estimates $\psi_{62}$. (Passive CORDICs #16-#19 rotate the remaining complex elements of second and sixth row.) Therefore, this stage is also final for configuration 6×2 so compression should stop to match preprocessor scalable rate of this configuration. Active CORDIC #20 rotates $B_{53}$ making it real and estimating $\varphi_{53}$. The remaining complex element of the fifth row ($B_{54}$) is rotated by the same angle using passive CORDIC #21.

At stage 9, since all $\psi$ angles of the first column are already estimated, CORDIC #1 is free to help estimate $\varphi$ angles of the fourth column of B. By this stage complex element $B_{4\times4}$ is available. This is the fourth element of the main diagonal of B that is associated with the fourth column of B. Therefore, active CORDIC #1 rotates $B_{44}$ making it real and estimating $\varphi_{44}$. Since we consider B of 8×4 configuration, passive CORDICs #2-#7 can be switched off. Active CORDIC #8 estimates $\psi_{53}$ (with all corresponding third and fifth row rotation using passive CORDICs #9-#10). Therefore, this stage is final for configuration 5×3 so compression should stop to match preprocessor scalable rate of this configuration. Active CORDIC #12 rotates $B_{82}$ making it real and estimating $\varphi_{82}$. The remaining complex elements of the eighth row are rotated by the same angle using passive CORDIC circuitry #13 and #14. Active CORDIC #15 estimates $\psi_{72}$. (Passive CORDICs #16-#19 rotate the remaining complex elements of second and seventh row.) Therefore, this stage is also final for configuration 7×2, and compression should stop to match preprocessor scalable rate of this configuration. Active CORDIC #20 rotates $B_{63}$ making it real and estimating $\varphi_{63}$. The remaining complex element of the sixth row ($B_{64}$) is rotated by the same angle using passive CORDIC #21.

At stage 10, active CORDIC #1 rotates $B_{54}$ making it real and estimating $\varphi_{54}$. Active CORDIC #8 estimates $\psi_{63}$ (with all corresponding third and sixth row rotation using passive CORDICs #9-#10). Therefore, this stage is final for configuration 6×3, and compression should stop to match preprocessor scalable rate of this configuration, in accordance with an embodiment. Since all $\varphi$ angles of the second column are already estimated, active CORDIC #12 (as well corresponding passive CORDICs #13 and #14) can be switched off in an embodiment. Active CORDIC #15 estimates $\psi_{82}$. (Passive CORDICs #16-#19 rotate the remaining complex elements of second and eighth row.) Therefore, this stage is also final for configuration 8×2, and compression should stop to match preprocessor scalable rate of this configuration, in accordance with an embodiment. Active CORDIC #20 rotates $B_{73}$ making it real and estimating $\varphi_{73}$. The remaining complex element of the seventh row ($B_{74}$) is rotated by the same angle using passive CORDIC #21.

At stage 11, active CORDIC #1 rotates $B_{64}$ making it real and estimating $\varphi_{64}$. Active CORDIC #8 estimates $\psi_{73}$ (with all corresponding third and seventh row rotation using passive CORDICs #9-#10). Therefore, this stage is final for configuration 7×3, and compression should stop to match preprocessor scalable rate of this configuration in accordance with an embodiment. Since all $\psi$ angles of the second column are estimated, active CORDIC #15 is free to help estimating $\psi$ angles of fourth column. Active CORDIC #15 estimates $\psi_{54}$. Therefore, this stage is also final for configuration 5×4, and compression should stop to match preprocessor scalable rate of this configuration. Active CORDIC

20 rotates $B_{83}$ making it real and estimating $\varphi_{83}$. The remaining complex element of the eighth row ($B_{84}$) is rotated by the same angle using passive CORDIC #21.

At stage 12, Active CORDIC #1 rotates $B_{74}$ making it real and estimating $\varphi_{74}$. Active CORDIC #8 estimates $\psi_{83}$ (with all corresponding third and eighth row rotation using passive CORDICs #9-#10). Therefore, this stage is final for configuration 8×3 so compression should stop to match preprocessor scalable rate of this configuration. Active CORDIC #15 estimates $\psi_{64}$. Therefore, this stage is also final for configuration 6×4 so compression should stop to match preprocessor scalable rate of this configuration. Since all $\varphi$ angles of the third column are already estimated, active CORDIC #20 (as well passive CORDIC #21) can be switched off.

At stage 13, active CORDIC #1 rotates $B_{84}$ making it real and estimating $\varphi_{84}$. Since all $\psi$ angles of third column are already estimated, active CORDIC #8 (as well as passive ones #9 and #10) can be switched off. Active CORDIC #15 estimates $\psi_{74}$. Therefore, this stage is also final for configuration 7×4 so compression should stop to match preprocessor scalable rate of this configuration.

At stage 14, since all $\varphi$ angles of the fourth column are estimated, active CORDIC #1 can be switched off. Active CORDIC #15 estimates $\psi_{84}$. Therefore, this stage is also final for configuration 8×4.

Finally, the described compression approach does not have the conventional initial last row Givens rotation to make it real. Thus, it requires a subtraction of the last row $\varphi$ angle from all other $\varphi$ angles of the corresponding column. Meanwhile $\psi$ angles remain untouched because they represent the angle between two real vectors. This approach saves one compression stage, thereby reducing the time needed to construct the required data symbols of the IMF packet.

Thus, the BF circuitry 412, using the efficient QR preprocessing method and CORDIC implementation method discussed above, is able to reduce the time needed to generate IMF data symbols and meet the Ndbps requirement.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for providing beamforming feedback in a communication channel, the method comprising:
    receiving, at a first communication device, a data packet from a second communication device via the communication channel;
    processing, at a beamformee circuitry of the first communication device configured to generate beam steering data for use by a transmitter of the second communication device, a plurality of tones of the received data packet to generate a compressed steering matrix corresponding to the communication channel;
    constructing, in parallel to the processing of the plurality of tones, at the beamformee circuitry of the first communication device, at least a first data symbol of an immediate feedback packet comprising a plurality of data symbols; and
    transmitting the at least flail the first data symbol of the plurality of data symbols of the immediate feedback packet, prior to completing the processing of all the plurality of tones of the received data packet and construction of a remainder of the plurality of data symbols of the immediate feedback packet, from the first communication device to the second communication device, the plurality of data symbols of the immediate feedback packet being for use by the second communication device to steer at least one subsequent transmission to the first communication device and including the compressed steering matrix.

2. The method of claim 1, wherein a size of each of the plurality of data symbols of the immediate feedback packet depends on a number of data bits per symbol specified in a modulation and coding scheme (MCS) defined for the immediate feedback packet, a number of available streams, and available bandwidth.

3. The method of claim 2, wherein each data symbol of the immediate feedback packet is constructed at a rate specified by the number of data bits per symbol specified in the MCS.

4. The method of claim 2, wherein each data symbol of the immediate feedback packet is constructed by processing the plurality of tones of the received data packet to generate the compressed steering matrix at a rate specified by the number of data bits per symbol specified in the MCS.

5. The method of claim 1, wherein a transmitter of the first communication device provides a request to the beamformee circuitry of the first communication device for a first data symbol of the immediate feedback packet to be transmitted to the second communication device; and
    wherein the beamformee circuitry of the first communication device, prior to receiving the request, is configured to process a sufficient number of tones of the received data packet to construct at least a number of bits sufficient to enable the transmitter of the first communication device to transmit the first data symbol at a rate specified by the number of data bits per symbol specified in an MCS.

6. The method of claim 1, wherein constructing the plurality of data symbols of the immediate feedback packet comprises:
    estimating a steering matrix based on a Long-Training Field (LTF) training sequence of a preamble of the received data packet; and
    performing a compression operation on each tone of the received data packet.

7. The method of claim 1, wherein a processing duration of each tone of the received data packet is dependent on a dimension of a channel state information (CSI) matrix defined by a number of transmitters of the second communication device and a number of receivers of the first communication device.

8. The method of claim 7, further comprising:
    deriving, at the first communication device, a first intermediate matrix from the CSI matrix by determining a product of the CSI matrix and a Hermitian transpose of the CSI matrix;
    finding a maximum diagonal element of the first intermediate matrix based on the number of transmitters of the second communication device;
    estimating an upper triangle matrix of the first intermediate matrix based on a number of Long-Training Field (LTF) training symbols of a preamble of the received data packet; and
    and scaling the estimated upper triangle matrix of the first intermediate matrix based on the maximum diagonal elements of the first intermedia matrix.

9. The method of claim 8, further comprising:
deriving, at the first communication device, a second intermediate matrix by determining a product of the first intermediate matrix and a Hermitian transpose of the first intermediate matrix;
finding a maximum diagonal element of the second intermediate matrix based on the number of transmitters of the second communication device; and
iteratively estimating and scaling a single column of the second intermediate matrix corresponding to the maximum diagonal element of the second intermediate matrix, wherein a number of columns to be estimated and scaled depends on a minimum of i) a number of transmitters of the second communication device, ii) a number of receivers of the first communication device, or iii) a predefined number smaller than the number of receivers of the first communication device.

10. The method of claim 9, further comprising:
compressing the first intermediate matrix using a plurality of Coordinate Rotation Digital Computer (CORDIC) processors, wherein the compression comprises:
for each column of the first intermediate matrix:
selecting at least two active CORDICs to rotate two complex elements of a column of the first intermediate matrix;
estimating a respective angle of rotation for the two complex elements of the column of the first intermediate matrix required to remove an imaginary portion of the two complex elements;
transmitting the estimated angles of rotations for the two complex elements of the column of the first intermediate matrix to a plurality of passive CORDICs;
rotating, using the plurality of passive CORDICs, the remaining complex elements of the rows of the first intermediate matrix by respective angle of rotation estimated by the active CORDICs;
estimating an angle between the respective real portions of the two complex elements; and
rotating, using the plurality of passive CORDICs, the remaining real and imaginary elements of the rows of the first intermediate matrix by the respective estimated angle between the respective real portions of the two complex elements.

11. A first communication device comprising:
a receiver having one or more integrated circuits configured to:
receive a data packet from a second communication device via a communication channel;
process a plurality of tones of the received data packet to generate a compressed steering matrix corresponding to the communication channel;
construct, in parallel to the processing of the plurality of tones, at least a first data symbol of an immediate feedback packet comprising a plurality of data symbols; and
a transmitter having one or more integrated circuits configured to:
transmit the at least flail the first data symbol of the plurality of data symbols of the immediate feedback packet, prior to completing the processing of all the plurality of tones of the received data packet and construction of a remainder of the plurality of data symbols of the immediate feedback packet, from the first communication device to a second communication device, the plurality of data symbols of the immediate feedback packet being for use by the second communication device to steer at least one subsequent transmission to the first communication device and including the compressed steering matrix.

12. The first communication device of claim 11, wherein a size of each of the plurality of data symbols of the immediate feedback packet depends on a number of data bits per symbol specified in a modulation and coding scheme (MCS) defined for the immediate feedback packet, a number of available streams, and available bandwidth.

13. The first communication device of claim 12, wherein each data symbol of the immediate feedback packet is constructed at a rate specified by the number of data bits per symbol specified in the MCS.

14. The first communication device of claim 12, wherein each data symbol of the immediate feedback packet is constructed by processing the plurality of tones of the received data packet to generate the compressed steering matrix at a rate specified by the number of data bits per symbol specified in the MCS.

15. The first communication device of claim 11, wherein the one or more integrated circuits of the transmitter is configured to:
provide a request, via a transmitter, to a beamformee circuitry for a first data symbol of the immediate feedback packet to be transmitted to the second communication device; and
prior to receiving the request, process a sufficient number of tones of the received data packet to construct at least a number of bits sufficient to enable the transmitter of the first communication device to transmit the first data symbol at a rate specified by the number of data bits per symbol specified in an MCS.

16. The first communication device of claim 11, wherein the one or more integrated circuits of the receiver, when constructing the plurality of data symbols of the immediate feedback packet, are configured to:
estimate a steering matrix based on a Long-Training Field (LTF) training sequence of a preamble of the received data packet; and
perform a compression operation on each tone of the received data packet.

17. The first communication device of claim 11, wherein a processing duration of each tone of the received data packet is dependent on a dimension of a channel state information (CSI) matrix defined by a number of transmitters of the second communication device and a number of receivers of the first communication device.

18. The first communication device of claim 17, wherein the one or more integrated circuits of the receiver is further configured to:
derive a first intermediate matrix from the CSI matrix by determining a product of the CSI matrix and a Hermitian transpose of the CSI matrix;
find a maximum diagonal element of the first intermediate matrix based on the number of transmitters of the second communication device;
estimate an upper triangle matrix of the first intermediate matrix based on a number of Long-Training Field (LTF) training symbols of a preamble of the received data packet; and
scale the estimated upper triangle matrix of the first intermediate matrix based on the maximum diagonal elements of the first intermedia matrix.

19. The first communication device of claim 18, wherein the one or more integrated circuits of the receiver is further configured to:

derive a second intermediate matrix by determining a product of the first intermediate matrix and a Hermitian transpose of the first intermediate matrix;

find a maximum diagonal element of the second intermediate matrix based on the number of transmitters of the second communication device; and iteratively estimate and scale a single column of the second intermediate matrix corresponding to the maximum diagonal element of the second intermediate matrix, wherein a number of columns to be estimated and scaled depends on a minimum of i) a number of transmitters of the second communication device, ii) a number of receivers of the first communication device, or iii) a predefined number smaller than the number of receivers of the first communication device.

20. The first communication device of claim 19, wherein the one or more integrated circuits of the receiver is further configured to:

compress the first intermediate matrix using a plurality of Coordinate Rotation Digital Computer (CORDIC) processors, wherein the plurality of integrated circuits, when performing the compression are configured to:

for each column of the first intermediate matrix:

select at least two active CORDICs to rotate two complex elements of a column of the first intermediate matrix;

estimate a respective angle of rotation for the two complex elements of the column of the first intermediate matrix required to remove an imaginary portion of the two complex elements;

transmit the estimated angles of rotations for the two complex elements of the column of the first intermediate matrix to a plurality of passive CORDICs;

rotate, using the plurality of passive CORDICs, the remaining complex elements of the rows of the first intermediate matrix by respective angle of rotation estimated by the active CORDICs;

estimate an angle between the respective real portions of the two complex elements; and rotate, using the plurality of passive CORDICs, the remaining real and imaginary elements of the rows of the first intermediate matrix by the respective estimated angle between the respective real portions of the two complex elements.

* * * * *